UNITED STATES PATENT OFFICE.

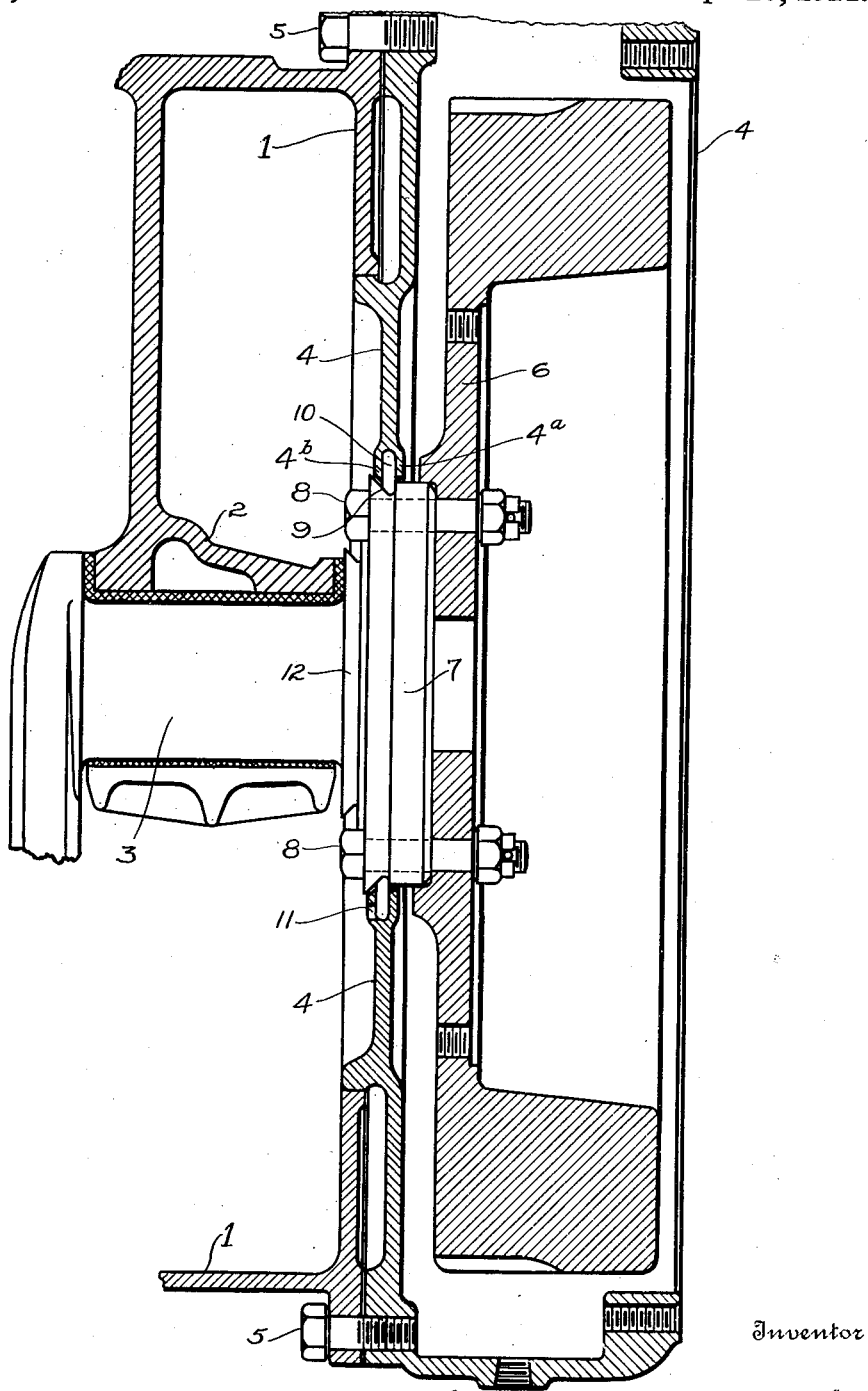

CHARLES BALOUGH, OF CANTON, OHIO, ASSIGNOR TO THE HERCULES MOTOR MANUFACTURING COMPANY, OF CANTON, OHIO, A CORPORATION OF OHIO.

OIL-SEALING DEVICE.

1,391,293.      Specification of Letters Patent.     Patented Sept. 20, 1921.

Application filed January 27, 1920. Serial No. 354,400.

*To all whom it may concern:*

Be it known that I, CHARLES BALOUGH, a citizen of the United States, residing at Canton, in the county of Stark and State of Ohio, have invented certain new and useful Improvements in Oil-Sealing Devices, of which the following is a specification.

This invention relates to an improved arrangement for preventing the leakage of oil around shafts or other moving parts from the casing or chamber containing the oil, it more particularly relating to devices for preventing the oil from passing from the crank case of an internal combustion engine into the adjacent fly-wheel housing, thereby dispensing with a gasket or similar device.

The object of my invention is to provide an arrangement of the character referred to which will be simple in construction and effective in operation.

A further object of my invention is to cause the oil to mount the surface of an inclined face of a disk thereby flowing toward the outer periphery of the disk, displacing the air in a small chamber about the revolving part, and as the face of the disk is inclined toward the crank case, the oil necessarily flows toward the crank case and by arranging a very small opening from the chamber to the outer air, the atmospheric air will have a tendency to assist the flow of oil away from the opening and toward the crank casing.

In the accompanying drawing, the figure represents a vertical section of so much of an internal combustion engine as is necessary to illustrate my invention.

Referring to the drawing, 1 represents a portion of a crank case of an internal combustion engine carrying oil in the usual way; 2 is one of the bearings therein for the crank shaft; 3 is a portion of the crank shaft; 4 is the fly-wheel housing secured to the crank case by the bolts 5; and 6 is the fly-wheel. Formed integrally with the end of the crank shaft is a disk 7 to which the fly-wheel is secured by the bolts 8. The inner portion of this disk 7 is provided with a peripheral groove having an angularly-extending face 9 which projects inwardly, the largest circumference of this face being greater than the circumference of the disk 7. The fly-wheel housing about this disk and its grooved portion is provided with an annular chamber 10, the extreme lower portion of which communicates with the interior of the crank case through an orifice 11. One wall $4^a$ of the chamber surrounds the disk 7 adjacent the outer side of the groove therein with a space of about .002" intervening, while the opposite or inner wall $4^b$ of the chamber surrounds the inclined face 9 with a space of from $\frac{1}{64}$ to $\frac{1}{32}$ of an inch intervening; the chamber itself surrounding the deepest part of the groove.

The result of this construction is that the angular face of the disk acts with centrifugal force to throw the oil away therefrom, thereby causing a displacement of such oil as finds its way between the wall $4^b$ and the disk, which produces a partial vacuum in the chamber 10 so that atmospheric pressure will prevent the oil from finding its way through the space between the disk 7 and the wall $4^a$.

There is also provided adjacent the bearing 2, an angularly faced flange 12, integral with the crank shaft, which has a tendency to throw inwardly any oil which escapes from the bearing.

Such surplus oil as may accumulate in the annular chamber 10 will drain to the bottom and escape into the casing through the orifice 11.

Having thus described my invention, I claim:—

1. In a structure of the character described, a liquid container having a wall provided with a circular opening, a circular revoluble member in said opening, with a space about the same, said wall having an annular chamber about said member, said member being provided with an upwardly and inwardly inclined circular face, arranged to direct liquid from a portion of the space between said wall and member into the interior of said container, said face extending with a gradually increasing diameter from a point in line with said chamber to a point in proximity to the interior of said container.

2. In a structure of the character described, a liquid container wall, and a revolving part extending through an opening in said wall with a comparatively small space between the two, said revolving part having an annular groove with a circular inclined face which projects to a point coincident with the interior face of said wall, said wall having an annular chamber surrounding said groove, the maximum and minimum diameter of said inclined face lying in vertical parallel planes.

3. In a structure of the character described, a liquid container wall, a revolving part located in an opening in said wall with a comparatively small space between the two, a portion of said revolving part having a plain periphery, another portion provided with an upwardly and inwardly inclined periphery which extends to a point leading to the interior of container, said wall having an annular chamber surrounding the deepest portion of said groove, one side of the wall of said chamber surrounding the plain periphery of said revolving part and the other wall of said chamber surrounding inclined periphery of said revolving part.

In testimony whereof, I have hereunto set my hand this 7th day of January 1920.

CHARLES BALOUGH.

Witnesses:
D. I. COOKE,
A. RITZMAN.